Aug. 7, 1923.
S. DUCSAY
1,464,354
CORN AND STALK CUTTING IMPLEMENT
Filed April 27, 1922
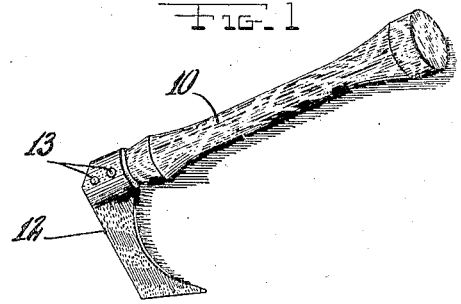
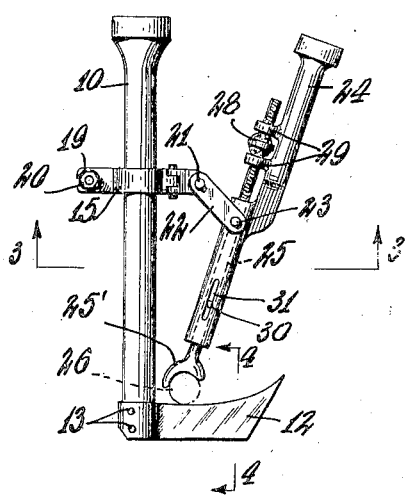
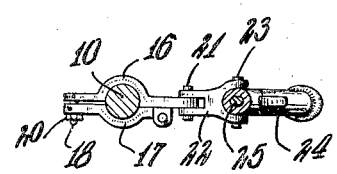
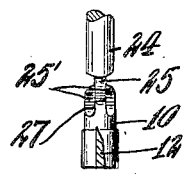
Inventor:
Stephen Ducsay
By *Zoltan F. Polachek*
Attorney Patented Aug. 7, 1923.

1,464,354

UNITED STATES PATENT OFFICE.

STEPHEN DUCSAY, OF CANONSBURG, PENNSYLVANIA.

CORN AND STALK CUTTING IMPLEMENT.

Application filed April 27, 1922. Serial No. 556,993.

*To all whom it may concern:*

Be it known that I, STEPHEN DUCSAY, a citizen of Hungary, residing at Canonsburg, in the county of Washington and State of Pennsylvania, have invented certain new and useful Improvements in Corn and Stalk Cutting Implements, of which the following is a specification.

This invention relates to cutting implements for cutting corn or any other heavy stalked type of vegetation, the invention having for an object to provide a simple and inexpensive cutting implement for the above purpose.

For further comprehension of the invention, and of the objects and advantages thereof, reference will be had to the following description and accompanying drawings and to the appended claims in which the various novel features of the invention are more particularly set forth.

Fig. 1 of the drawings is a perspective view showing one embodiment of my improved cutting implement.

Fig. 2 is a side view indicating a modified form of the implement.

Fig. 3 is a horizontal section on the line 3—3 of Fig. 2.

Fig. 4 is a detail transverse vertical section on the line 4—4 of Fig. 2.

In the simplest form of the cutting implement shown in Fig. 1 of the drawings I provide a handle 10 comprising a straight bar of circular cross section and having an enlarged head 11 at one end. To the opposite end of the handle I secure a cutting blade 12 which may be riveted at one end to the handle as at 13 and which extends transversely of the latter. The rearwardly facing edge of this blade forms the cutting edge and is suitably sharpened, being preferably given a concave curvature from end to end thereof.

In the construction shown in Figs. 2, 3 and 4 I provide an attachment adapted to be clamped on the handle 10 and which is particularly adapted for use in cutting stalks of considerable toughness. This attachment comprises an arm 15 clamped at one end upon the handle approximately midway between the ends thereof and projecting transversely thereto in a common plane with the blade 12. For securing the arm 15 to the handle it may be provided with a split collar comprised of an integral part 16 and a hinged part 17, the part 16 having hinged thereto a bolt 18 adapted to engage in a notch 19 in the free edge of the part 17 and having a nut 20 threaded thereon.

The opposite end of the arm 15 has hinged thereto as at 21 one end of a short link 22 which is hinged to its other end as at 23 to a bar 24, the link engaging the bar 24 at a point between the ends of the latter, the portions of the bar extending respectively forward and rearward from the pivot point 23 being offset from one another as shown.

Slidably engaged in a boring extending longitudinally through the forward portion of the bar is a rod 25 having a cupped element 25' on its forward end which is adapted to engage and partially straddle the stalk indicated at 26 and is slotted as at 27 to accommodate the blade. The rod is held adjustably in the bar 24 by means of a nut 28 swiveled between a pair of ears 29 fixed to the offset rear part of the bar and threaded over the screw threaded rear end of the rod 25 which projects from the forward part of the bar. The rod is held from turning in the bar 24 by a pin 30 fixed thereto and engaging in a slot 31 in the bar. The longitudinal curvature of the cutting edge of the latter is eccentric or spiral with respect to the pivot axis 21 of link 22, the point of the blade being nearer such pivot axle than the root thereof.

In the use of the implement the bar 24 is pulled backward from the blade 12 and the latter passed behind the stalk, with its cutting edge engaged therewith near the root end of the blade. The bar 24 is then pushed forward toward the stalk, until its recessed end 25 is bearing on the latter, the parts being adjusted, with reference to the size of the stalk to be cut so that in this position the line 22 extends obliquely with respect to the arm 15 and bar 24 with its free end swung toward the blade 12, as shown in Fig. 2. The diverged ends of the bar 24 and handle 10 are then pressed toward one another. When pressure is thus applied, the link 22 and bar 24 tend to straighten out one another thus forcing the blade and the bar-end toward one another. At the same time the blade is drawn, by the swinging movement of handle 10 across the stalk, severing the latter.

Having thus described my invention what I claim as new and desire to protect by Letters Patent of the United States is as follows:

1. A stalk-cutting implement comprising a straight handle element, a blade fixed to one end thereof and extending transversely thereto and having its rearwardly facing edge sharpened and concavely curved from end to end, and an abutment member carried by said handle and adapted to engage the stalk on the opposite side to the blade, and means for causing said abutment member to have relative movement with respect to said blade either toward or along the latter as desired.

2. A stalk-cutting implement comprising a handle element, a blade extending transversely thereto and having its rear edge sharpened, an arm adapted to be fixed on said handle, a link pivoted to said arm, and a bar pivoted to said link between its ends and having both ends free, one end of said bar being adapted to engage said stalk as an abutment for said blade and the other to serve as a handle.

3. A stalk-cutting implement comprising a handle element, a blade extending transversely thereto and having its rear edge sharpened, an arm adapted to be fixed on said handle, a link pivoted to said arm, and a bar pivotally mounted upon said link and adapted to engage said stalk as an abutment for said blade, and means for detachably securing said arm to said handle.

4. A stalk-cutting implement comprising a handle element, a blade extending transversely thereto and having its rear edge sharpened, an arm adapted to be fixed on said handle, a link pivoted to said arm, and a bar pivoted to said link between its ends with both ends free, one end of said bar being adapted to engage said stalk as an abutment for said blade, said blade having its cutting edge concavely curved eccentric to the point of attachment of said link to said handle.

5. A stalk-cutting implement comprising a handle element, a blade extending transversely thereto and having its rear edge sharpened, an arm adapted to be fixed on said handle, a link pivoted to said arm, and a bar pivoted to said link and adapted to engage said stalk as an abutment for said blade, said bar having its end slotted to receive the blade, and concaved to partially straddle the stalk.

6. A stalk-cutting implement comprising a handle element, a blade extending transversely thereto and having its rear edge sharpened, an arm adapted to be fixed on said handle, a link pivoted to said arm, and a bar pivoted to said link and adapted to engage said stalk as an abutment for said blade, said bar having its forward end longitudinally extensible with respect to the main body of the bar.

7. A stalk-cutting implement comprising a handle element, a blade extending transversely thereto and having its rear end sharpened, an arm fixed on said handle and extending transversely thereto, a link pivoted to said arm, a bar pivotally attached between its ends to said link and having forwardly and rearwardly extending portions laterally offset from one another, a stalk-engaging rod slidable in the forward portion of the bar and having its rear end screw-threaded and projecting along beside the rear portion of the bar, a pair of ears on said rear portion of the bar, and a nut swiveled between said ears and engaging said screw-threaded end of the rod.

In testimony whereof I have affixed my signature.

STEPHEN DUCSAY.